(12) United States Patent
Rosenthal et al.

(10) Patent No.: US 7,437,000 B1
(45) Date of Patent: Oct. 14, 2008

(54) FULL SPECTRUM COLOR DETECTING PIXEL CAMERA

(76) Inventors: Eric Rosenthal, 191 Beacon Hill Rd., Morganville, NJ (US) 07751-4208; Richard Jay Solomon, P.O. Box 187, Monson, MA (US) 01057; Clark Johnson, 5657 Steeplechase Dr., Waunakee, WI (US) 53597

( * ) Notice: Subject to any disclaimer, the term of this patent is extended or adjusted under 35 U.S.C. 154(b) by 614 days.

(21) Appl. No.: 10/798,159

(22) Filed: Mar. 11, 2004

Related U.S. Application Data

(60) Provisional application No. 60/454,555, filed on Mar. 14, 2003.

(51) Int. Cl.
*G06K 9/34* (2006.01)

(52) U.S. Cl. .................. 382/173; 382/140; 382/164; 382/171; 382/321; 356/319; 356/300; 356/302; 356/326; 356/213

(58) Field of Classification Search ............... 382/173, 382/140, 164, 171, 321; 356/319, 300, 302, 356/326, 213, 416, 432, 455; 101/171, 211; 358/1.9, 504
See application file for complete search history.

(56) References Cited

U.S. PATENT DOCUMENTS

| | | | | |
|---|---|---|---|---|
| 5,957,049 A | * | 9/1999 | Ammeter et al. ............ 101/211 |
| 6,029,115 A | * | 2/2000 | Tracy et al. .................... 702/22 |
| 6,611,777 B2 | * | 8/2003 | Samsoondar ................ 702/104 |
| 6,753,956 B2 | * | 6/2004 | Clark et al. .................. 356/300 |
| 6,917,421 B1 | * | 7/2005 | Wihl et al. ................ 356/237.5 |
| 6,963,399 B2 | * | 11/2005 | Cargill et al. ................ 356/328 |
| 2002/0018203 A1 | * | 2/2002 | Battle et al. ................. 356/319 |
| 2003/0077660 A1 | * | 4/2003 | Pien et al. ..................... 435/7.1 |

* cited by examiner

Primary Examiner—Matthew C Bella
Assistant Examiner—Ali Bayat

(57) ABSTRACT

This invention comprises the means for the capture of full spectrum images in an electronic camera without the use of color primary filters to limit the spectral color gamut of the captured image. The fundamental principle of the invention is that each pixel of the image sensor acts as an independent spectrophotometer and spectral separator.

Electromagnetic energy enters though a slit or collimating optic.

Electromagnetic energy gets diffracted into component spectra by diffraction grating spectrophotometer for each pixel of image Electromagnetic energy leaves diffraction grating at different angles based on wavelength of the energy Spectrophotometer separates light for each pixel into its spectral components onto photodetector line array elements.

Individual line array elements which are activated determine the original radiance level of the light source containing that specific wavelength region. The sum of these regions determines the spectral signature of the light at that pixel element. Many pixels arranged in a two-dimensional matrix would generate the image frame. Sequencing frame yields a full-spectrum moving image.

11 Claims, 3 Drawing Sheets

FULL SPECTRUM COLOR DETECTING PIXEL CAMERA

CROSS REFERENCE TO RELATED APPLICATIONS

The present application claims priority from provisional application 60/454,555, filed Mar. 14, 2003. This related application is hereby incorporated herein by reference.

TECHNICAL FIELD AND BACKGROUND ART

This invention relates to a method of capturing full spectrum color images in an electronic color camera using a Full-Spectrum Pixel Sensor Color Analyzer.

PRIOR ART

The human vision system has evolved based on an environment for processing information that exists only in nature under continuous full spectrum ambient lighting conditions. Relatively recently, during the past 400 years, we have exposed our vision systems to unusual new requirements. The reading of printed text and pictures in artificial light, and screened photographs, television and computer displays having colors restricted fundamentally to three to five color primaries.

Most film, video, digital cameras and display systems are based upon the three-color, metameric theory of spectral capture, using Red Green Blue (RGB) or Cyan Magenta Yellow (CMY) primaries. Hence, the camera's spectral range or gamut is limited by the selected color primaries supported by the sensors and camera system. The color gamut following these tri-stimulus parameters does not match the enormous spectral range of the human visual system. There is no way such conventional systems can replicate what a human can see in the field, where the human visual system is capable of a color palette which cannot be physically displayed by only three to five primary lights. Futhermore, these systems are inflexible, based on a mythical "standard" human observer, and cannot be readily adjusted for human diversity or handicaps. Four or five primaries are sometimes used for ink on paper or special displays, which expands the gamut somewhat, but still cannot reproduce all of the colors that humans can see.

SUMMARY OF THE INVENTION

This invention comprises the means for the capture of full spectrum images in an electronic camera without the use of color primary filters to limit the spectral color gamut of the captured image. The fundamental principle of the invention is that each pixel of the image sensor acts as an independent spectrophotometer and spectrum analyzer.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires.

Spectrophotometer includes any device that resolves the various regions of electromagnetic light spectrum into discrete components, through the mechanism of dispersion, and measures the radiance of these discrete components.

Diffraction grating spectrophotometer is a device that uses a diffraction grating as its dispersive mechanism.

Spectrum analyzer is an instrument that measures the irradiance energy distribution with frequency for electromagnetic waveforms, capturing their relative spacing and amplitudes over a designated bandwidth.

This invention comprises the means for the capture of full spectrum images in an electronic camera without the use of color primary filters to limit the spectral color gamut of the captured image. The fundamental principle of the invention is that each pixel of the image sensor acts as an independent spectrophotometer, spectral region separator, and spectrum analyzer. By using a diffraction grating to disperse the spectrum, this invention, compared to a spectrum dispersed by a prism, yields:

a) greater resolving power, and
b) programmable bandpass separation and spectral distribution.

Figure 1:
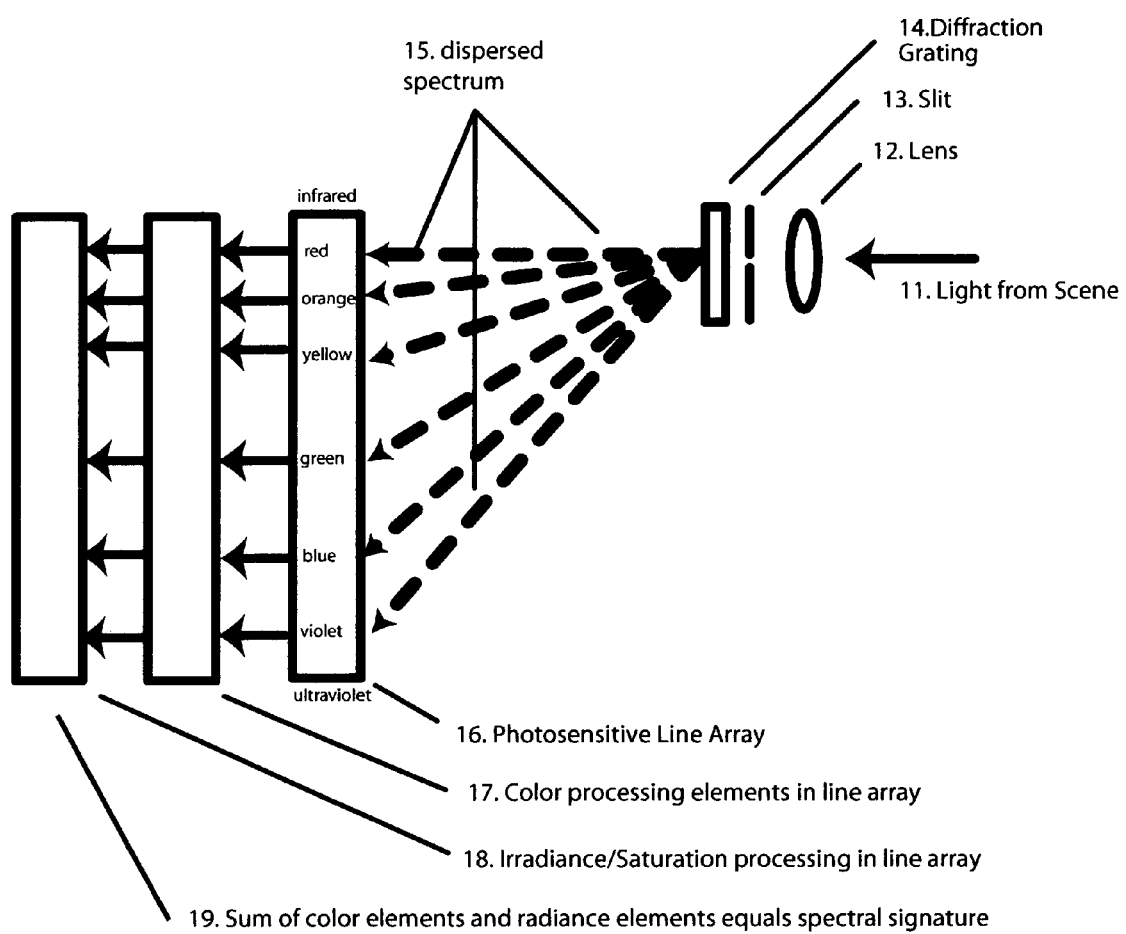
FIG. 1 is the color detecting pixel element

Referring to FIG. 1 which illustrates a preferred embodiment of the invention, electromagnetic light energy 11 from each picture element of a scene is focused by lens 12 through slit 13 onto diffraction grating 14. The electromagnetic energy is diffracted by grating 14 into component spectral wavelengths 15. Grating 14 acts as a conventional electromagnetic frequency analyzer, dispersing the components of spectrum 15 at different angles based on the wavelength of each energy segment. The individual segments 15 of the spectrum are detected by electrical photosensitive line array element 16, such as a Pixim Dyna 2000 CMOS array. Individual photodetector line array elements 17 in line array 16 that are activated by the components of dispersed spectrum 15 detect and transmit the irradiance and saturation 18 of the specific spectral region for each picture element. The sum 19 of individual detector element 17 and irradiance 18 in line array 16 determines the spectral energy function signature for each picture element.

In a second embodiment of the invention, the photodetector line array 16 may be constructed out of any electrically photosensitive device capable of being segmented, such as a CCD photodiode.

Figure 2:
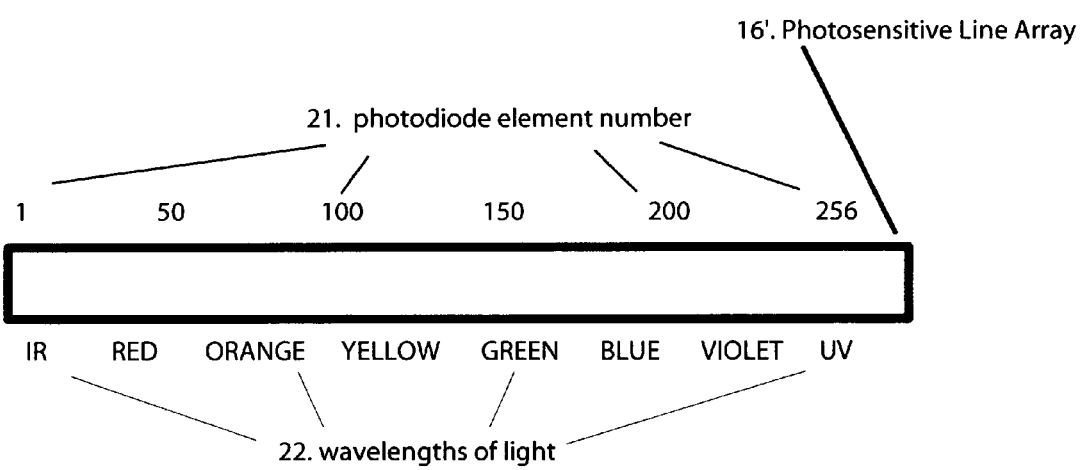
FIG. 2 is the photo sensitive array

Referring to FIG. 2, line array 16' from FIG. 1 is exploded to indicate the dispersed spectral regions for wavelengths 22 from infrared to ultraviolet. The line of numbers 21 indicates 256 photodiode elements in line array 16'. The photodiode element number 1 on array 16' is at the infrared end of the dispersed spectrum and the photodiode element number 256 is at the ultraviolet end of the dispersed spectrum. The conventionally recognized spectrum light regions 22—red, orange, yellow, green, blue and violet—are in between the extremes of infrared and ultraviolet light. The amplitude of detected energy at each element 21 is equivalent to the radiance at the specific wavelength, bounded by the band limitations of its spectral separation. In this embodiment, using an Ocean Optics S2000 spectrophotometer with a grating number 3,256 photodiodes cover a total spectral bandwidth of 500 nanometers, sensitive to the electromagnetic spectrum from 350 nanometers on the ultraviolet end to 850 nanometers on the infrared end. This embodiment has a spectral region bandwidth of approximately 1.95 nanometers for each of the 256 photodiodes. If a specific photodiode element 21 in photo diode line array 16' is active at a selected wavelength, for example red at 650 nanometers, then there is energy received at that wavelength representing a peak centered at 650 nanometers with a bandwidth equal to 1.95 nanometers.

Figure 3:
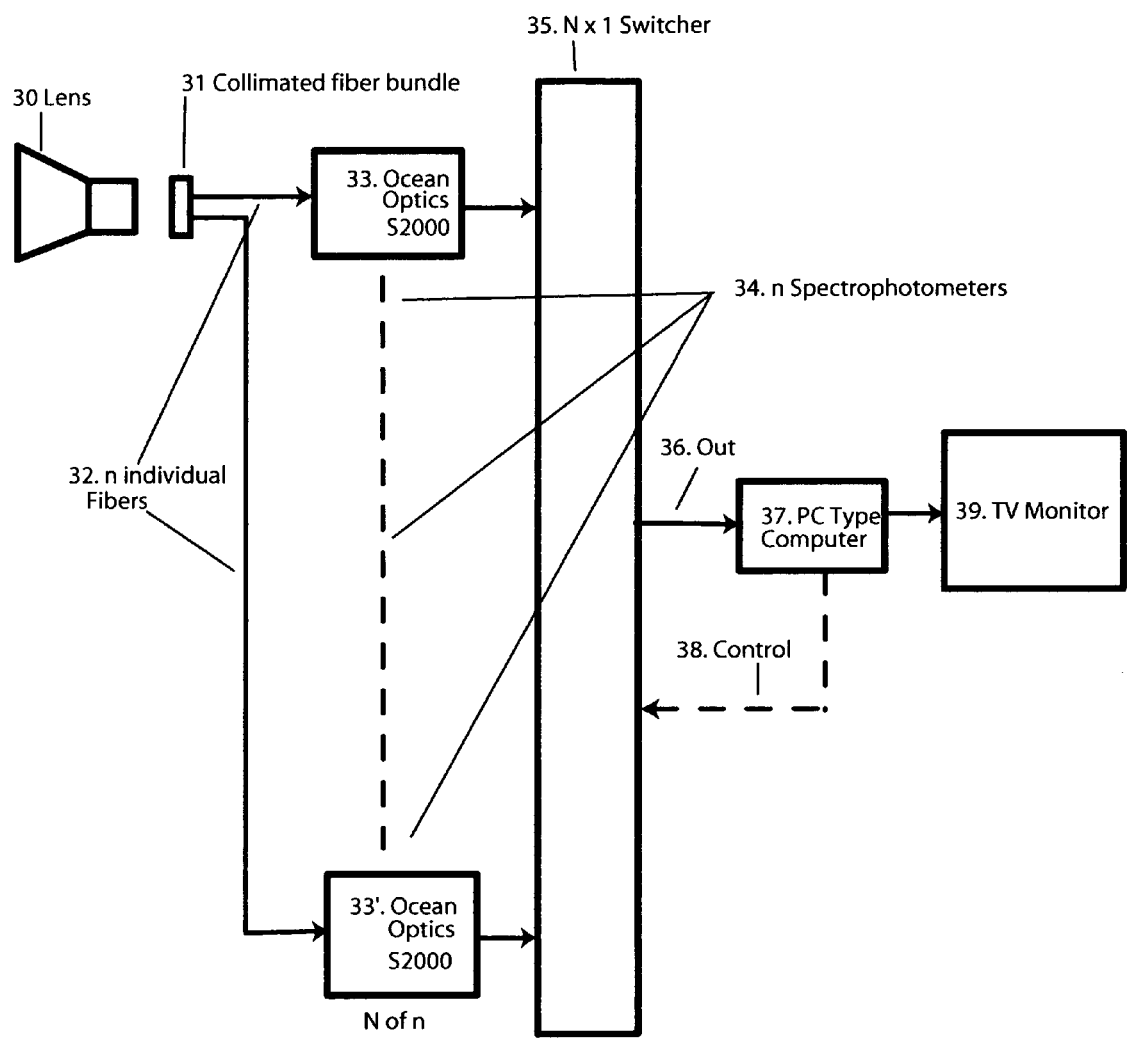
FIG. 3 is the proof of principle system design

Referring to FIG. 3, which illustrates how someone experienced in the art could construct a proof-of-principle full-spectrum color prototype using contemporary and available components, light enters lens 30 and focuses the image onto collimated fiber bundle 31. Fiber bundle 31 contains n individual fibers 32, where n is a number sufficiently large to create an image for the proof of principle. Individual fibers 32 from bundle 31 are directed to 33 through 33' comprising n line array diffraction grating spectrophotometers 34, such as an Ocean Optics S2000. Each individual collimated fiber 32 is directed to one of n individual line array diffraction grating spectrophotometers 34 to analyze the spectral energy function signature of each pixel of the captured image. The output of each spectrophotometer 33 . . . 33' is directed to sequential switcher 35 that selects and transmits the relevant radiance data from each pixel spectrophotometer's spectral region to switcher 35 output 36. Output 36 is connected to computer 37 for processing and analysis of the spectral energy function signature data received from each of the n spectrophotometers 34. Computer 37 compiles and sums the spectral radiance information from each pixel and analyzes the spectral energy function signature for each pixel of the image.

To create a two-dimensional image, the array 34 of spectrometers are scanned using switcher 35, pixel by pixel, line by line for a full frame. Frames are sequenced to capture full-spectrum motion images.

What is claimed is:

1. A method of capturing spectral energy content of an image, the method comprising:
   a. segmenting the image into an array of pixels, each pixel of the image having an electromagnetic spectral energy function;
   b. separately directing the spectral energy element of each pixel to a spectral energy dispersion device that spreads the energy function into a continuous spectrum representative of an entire spectrum of interest; and
   c. for each pixel, functioning as a spectrum analyzer, determining an amplitude value for each of the resolved spectral components.

2. A method according to claim 1, wherein the spectral energy content is that of light and determining an amplitude value includes using a spectrophotometer.

3. A method according to claim 2, wherein using the spectrophotometer includes using a linear array of photo-detectors in the spectrophotometer to evaluate the amplitude value for each of the resolved spectral components.

4. A method according to claim 1, wherein dispersing spectral energy includes using a diffraction grating and using the grating includes modulating it to detect smaller wavelength bandwidth by jittering or stressing the grating.

5. A method according to claim 1, wherein dispersing spectral energy includes using a diffraction grating.

6. A method according to claim 1, wherein the spectral energy content is in the x-ray region.

7. An apparatus for capturing spectral energy content of an image, the apparatus comprising:
   a. a device that segments the image into an array of pixels, each pixel of the image having an electromagnetic spectral energy function;
      (i) a diffraction grating that disperses spectral energy from such pixel into resolved spectral components in a spectrum of interest; and
      (ii) a spectrophotometer that determines an amplitude value for each of the resolved spectral components.

8. An apparatus according to claim 7, wherein the device that segments the image includes a fiber optic bundle.

9. A method according to claim 7, wherein the spectrophotometer includes a linear array of photo-detectors.

10. A method according to claim 7, further comprising:
    a modulator that modules the diffraction grating to detect smaller wavelength bandwidth by jittering or stressing the grating.

11. A method according to claim 7, wherein the spectral energy content is in the x-ray region.

* * * * *

UNITED STATES PATENT AND TRADEMARK OFFICE
CERTIFICATE OF CORRECTION

| | | |
|---|---|---|
| PATENT NO. | : 7,437,000 B1 | Page 1 of 1 |
| APPLICATION NO. | : 10/798159 | |
| DATED | : October 14, 2008 | |
| INVENTOR(S) | : Rosenthal, Solomon and Johnson | |

It is certified that error appears in the above-identified patent and that said Letters Patent is hereby corrected as shown below:

Col. 4 Line 35, change "modules" to "modulates"

Signed and Sealed this

Twentieth Day of January, 2009

JON W. DUDAS
*Director of the United States Patent and Trademark Office*